United States Patent [19]
Kuhlenschmidt et al.

[11] Patent Number: 5,689,971
[45] Date of Patent: Nov. 25, 1997

[54] ABSORPTION COOLING SYSTEM UTILIZING HELICAL ABSORBERS

[75] Inventors: Donald Kuhlenschmidt, Evansville, Ind.; Michael W. Klintworth, Covington, Ohio

[73] Assignee: Gas Research Institute, Chicago, Ill.

[21] Appl. No.: 584,189

[22] Filed: Jan. 11, 1996

Related U.S. Application Data

[63] Continuation-in-part of Ser. No. 532,241, Sep. 22, 1995, abandoned.

[51] Int. Cl.$^6$ .................. F25B 15/12; F25B 37/00
[52] U.S. Cl. .................. 62/484; 62/494; 165/156
[58] Field of Search .................. 62/476, 484, 485, 62/494, 497, 101; 165/154, 156

[56] References Cited

U.S. PATENT DOCUMENTS

| | | |
|---|---|---|
| 2,781,644 | 2/1957 | Saposnikov et al. |
| 3,452,551 | 7/1969 | Aronson . |
| 3,990,263 | 11/1976 | Ainbinder et al. |
| 4,338,268 | 7/1982 | Wilkinson et al. |
| 4,467,623 | 8/1984 | Reimann . |
| 4,477,396 | 10/1984 | Wilkinson . |
| 4,524,587 | 6/1985 | Kantor . |
| 4,570,456 | 2/1986 | Reimann et al. |
| 4,722,194 | 2/1988 | Kantor . |
| 4,881,376 | 11/1989 | Yonezawa et al. |
| 5,097,676 | 3/1992 | Erickson ................ 62/476 |
| 5,263,340 | 11/1993 | Sekoguchi et al. |
| 5,271,235 | 12/1993 | Phillips et al. ........... 62/101 |
| 5,339,654 | 8/1994 | Cook et al. ............ 62/476 |

FOREIGN PATENT DOCUMENTS

| 259387 | 10/1988 | Japan .................. 165/156 |
|---|---|---|

*Primary Examiner*—William Doerrler
*Attorney, Agent, or Firm*—McAndrews, Held & Malloy, Ltd.

[57] ABSTRACT

A fluid heat exchange apparatus is disclosed that can be used as an absorber in an absorption cooling system. The compact absorber design uses concentric thermally conductive cylinders to form alternating annular passages for a heat transfer fluid and a solution. The heat transfer fluid passages contain a generally helical coil. The generally helical coil distributes the heat transfer fluid in a generally helical path between the thermally conductive cylinders. The solution passages also contain a generally helical coil. However, the solution passage coils are grooved rods. The grooved rods allow solution to flow between the rods and the walls of the cylinders. The solution flows down the cool walls of the thermally conductive cylinders. Simultaneously, refrigerant vapor flows upward in a generally helical path within the solution passages and is absorbed into the solution droplets. Further, an absorption cooling system is disclosed that utilizes multiple helical absorbers.

17 Claims, 6 Drawing Sheets

ABSORPTION COOLING SYSTEM UTILIZING HELICAL ABSORBERS

CROSS-REFERENCE TO RELATED APPLICATION

The present application is a continuation-in-part of the patent application by the same inventors, Donald Kuhlenschmidt and Michael W. Klintworth, U.S. Ser. No. 08/532,241, filed Sep. 22, 1995 now abandoned. The entire disclosure of the application including the drawings and appendices are incorporated herein by reference as if set forth fully in this application.

FIELD OF THE INVENTION

The present invention relates to a fluid heat exchange apparatus, in particular an absorber for use in an absorption cooling system.

BACKGROUND OF THE INVENTION

Absorption cooling systems are well known. In an absorption cooling system, a generator heats a refrigerant solution comprising a "strong" or concentrated solution of a more-volatile or refrigerant component in a less-volatile or solvent component. The heat drives the refrigerant from the strong solution to separate a refrigerant vapor, leaving a "weak solution" that is depleted of the refrigerant.

Where the refrigerant solution is a solution of a non-volatile solute in a volatile solvent, such as lithium bromide in water, the "weak solution" contains a higher concentration of the solute but a lower concentration of the solvent than the corresponding "strong solution." Where the refrigerant solution is a solution of a more-volatile solute in a less-volatile solvent, such as ammonia in water, the "weak solution" is depleted of ammonia and is mostly water, while the "strong solution" is a more concentrated ammonia solution.

After being separated in the generator, the refrigerant vapor leaves the generator, flowing to a condenser. In the condenser the refrigerant vapor is placed under pressure and heat is removed to an external heat sink. As a result, the vapor condenses to form a refrigerant liquid. After leaving the condenser, the refrigerant liquid flows to an evaporator. The evaporator relieves the pressure on the refrigerant liquid and the refrigerant evaporates, again forming a vapor. This evaporation of the refrigerant draws heat from a heat load and creates the cooling effect of a refrigerator or air conditioner.

The refrigerant vapor from the evaporator flows to an absorber. The weak solution remaining in the generator also flows to the absorber. In the absorber, the weak solution reabsorbs the refrigerant, reforming the strong solution.

Typically, the absorber is arranged so that the weak solution enters the top of the enclosed absorber and flows downward. The refrigerant vapor enters the bottom of the absorber and flows upward. In counterflow with the refrigerant vapor, the weak solution absorbs the refrigerant and becomes a strong solution. The strong solution then flows back to the generator and the cycle repeats.

Having been heated to drive off refrigerant vapor in the generator, the weak solution is very hot. Also, the absorption process further heats the solution as it becomes stronger. More refrigerant can be absorbed in the refrigerant solution if the solution is cooled. Therefore, to facilitate reabsorption of the refrigerant into the solution, the solution must be cooled.

A coolant circulates through the absorber and draws heat from the solution and the refrigerant vapor. After circulating through the absorber, the coolant exits the absorber and is either disposed or cooled at an external heat sink and recycled.

The coolant circulates through the absorber in a thermally conductive conduit. The conduit prevents intermixing of the liquid coolant and the refrigerant solution. The solution, however, transfers heat through the walls of the conduit and into the coolant. To improve efficiency, an absorber must promote heat transfer by providing intimate contact between the weak solution and the cooler surface of the coolant conduit. Also, for maximum efficiency, the coolant exiting the absorber should be nearly as hot as the entering weak refrigerant solution. The efficient absorber wastes little of the cooling potential in the coolant.

In the prior art, absorbers circulate the coolant in metal pipe or tubing. Metal pipe provides a simple method for circulating a coolant in an absorber. The refrigerant solution flows or is sprayed over the cooler surface of the pipe or, alternatively, the coolant pipe is submerged in a pool of solution. This prior absorber design increases heat transfer by increasing the length of coolant pipe in the absorber.

Coolant pipe, however, has several disadvantages. First, metal pipe is expensive and a large amount is needed in an absorber. Also, metal pipe must be formed into complex and intricate convoluted shapes that are difficult and expensive to manufacture. Second, pipe inefficiently transfers heat from the refrigerant solution to the enclosed coolant. For efficient heat transfer, the metal pipe can be completely submerged in a pool of solution. Then, however, only the surface of the solution contacts the refrigerant vapor. The coolest portion of the solution under the surface does not contact the refrigerant vapor.

Ideally, the refrigerant solution simultaneously contacts both the coolant conduit and the refrigerant vapor. While the solution is cooled, the solution may simultaneously absorb refrigerant. Older absorber designs recognize the benefit of simultaneous contact. In these designs, the refrigerant solution meanders over coolant baffles within a vapor space or flows through a series of pools. Alternatively, the solution is sprayed or dripped through a vapor space onto coolant pipe. These designs, however, require a large amount of space. In particular, these designs have relatively large horizontal cross sections and, correspondingly, require a large amount of floor or ground space.

Reduced size has become the greatest challenge in absorber construction. If absorber size can be reduced, absorption cooling systems will find more widespread application. Further, if an absorber can be provided with a relatively small horizontal cross section or "footprint", the absorber would find still further applications.

Also, many absorption cooling systems utilize a heat exchanger to transfer heat from the weak solution flowing to the absorber to the strong solution flowing to the generator. As an additional component, the heat exchanger requires still more space and added expense.

Finally, in the prior art, absorber designs have not been easy to modify. Manufacturers seek to modify the performance characteristics of an absorber design to adapt a given absorber to multiple applications or to optimize the performance of a given absorber. An absorber performs optimally when the weak solution becomes fully saturated with refrigerant, all refrigerant vapor entering the absorber is absorbed, and the absorber wastes none of the cooling potential in the liquid coolant. To adapt or optimize the performance of a given absorber, prior art designs forced a manufacturer to modify the external inputs to the absorber. For example, the manufacturer could modify the rate of flow of the refrigerant solution, refrigerant vapor, or coolant into the absorber. The manufacturer could not easily modify a given absorber design to optimize its performance.

Accordingly, those skilled in the art of absorber design have sought an absorber that fully saturates a solution, uses a coolant efficiently, is inexpensive to manufacture, is compact in size, and is easily modified to adapt a given absorber to multiple applications or to optimize a given absorber.

Therefore, an object of the present invention is to provide a heat exchange apparatus that maximizes heat transfer between two fluids.

Also, an object of the present invention is to provide an absorber that maximizes contact between a refrigerant solution and a refrigerant vapor so that the solution becomes fully saturated with refrigerant vapor.

A further object of the present invention is to provide an absorber that maximizes the cooling potential of a coolant passing through the absorber.

Another object of the present invention is to provide an absorber that does not use metal pipe to carry liquid coolant through the absorber.

An additional object of the present invention is to provide an absorber that uses a common housing and common parts to build similarly sized and similarly constructed absorbers with different performance characteristics.

A still further object of the present invention is to provide an absorber that is compact in size with a relatively small horizontal cross section.

Additionally, an object of the present invention is to provide an absorber that maintains a relatively constant vapor flow rate through the absorber.

Yet another object of the present invention is to integrate an absorber and a heat exchanger in a single unit and take advantage of the temperature differential between the strong solution exiting the absorber and the weak solution entering the absorber.

Finally, an object of the present invention is to provide an absorber that is simple and economical to manufacture.

SUMMARY OF THE INVENTION

One aspect of the invention is an apparatus that can be used for transferring heat from a fluid, dissolving a vapor into the fluid, or both. The apparatus includes first and second substantially parallel walls defining a space between them. At least one rod is located in this space and is adjacent to both walls. The rod subdivides the space between the walls, defining a tortuous fluid path in the space. In a related aspect of the invention, a ridge replaces the rod and defines a tortuous fluid path in the space between the two walls.

The apparatus can include a third wall that is substantially parallel to the second wall, defining a second space between them. The second wall is thermally conductive to allow heat transfer from the first space to the second space or vice versa.

In one embodiment, the first, second and third walls are substantially concentric cylinders and the axis of the cylinders is normally substantially vertical. ("Substantially vertical" as used here means sufficiently vertical that the device can operate, at least to some degree, so that fluid can either flow directly in the direction regarded as substantially vertical or flow obliquely in a different direction that has a component in the direction regarded as substantially vertical. "Normally substantially vertical" as used here means that, at least when the device is mounted and in use or ready to be used, it is substantially vertical.)

A second rod can be located between and adjacent to the second and third walls, subdividing the second space to form a tortuous fluid path.

The first and second rods can be generally helical coil rods that define generally helical passages bounded by successive runs of the rods in their respective spaces. (As used here, a "generally helical coil rod" is a rod wound to form a shape at least resembling a cylinder. A "generally helical passage" is the space bounded by the runs of a generally helical coil rod and the cylinder walls adjacent to the generally helical coil rod.)

In at least one space, the generally helical coil rod can have a circumferentially grooved substantially vertical surface with substantially vertical grooves that allows a thin film of solution to flow substantially vertically downward between the rod and an adjacent cylinder wall. Also in that space, the generally helical coil can direct a vapor to be dissolved in a solution upward through the generally helical passage. In the other space, the generally helical coil rod directs a heat transfer fluid through the generally helical passage in heat transfer communication with the solution.

In a further embodiment, the absorption cooling system has a first absorber and a second absorber. The first absorber has a plurality of substantially concentric cylinders defining a plurality of annular spaces between the cylinders. (As used here, "substantially concentric cylinders" means that the cylinders share a common center but are of different radii to create substantially parallel cylindrical walls. The walls are sufficiently close to facilitate efficient fluid flow between the substantially parallel cylindrical walls.) The annular spaces include a solution space and an adjacent heat transfer fluid space separated by a thermally conductive cylinder. Generally helical coil rods are located in the spaces to create helical passages within the spaces. The second absorber has a weak solution space and a strong solution space in heat exchange relationship. In a still further embodiment, the second absorber may be constructed similarly to the first absorber.

The present invention has several advantages. First, the concentric cylinders and generally helical coils increase the distance of fluid flow in a compact space. Second, the cylindrical walls provide improved heat transfer over conventional designs. Third, the circumferentially grooved rod provides improved cooling of the solution by directing a thin film of the solution along the thermally conductive walls of the cylinder. Fourth, the circumferentially grooved rod provides improved absorption by increasing the contact of solution with a vapor space. Fifth, compared to conventional designs, the invention is inexpensive to manufacture. Sixth, the absorber is compact in size with a relatively small horizontal cross section. Seventh, the concentric cylinders and generally helical coils allow a manufacturer to build similarly sized and similarly constructed absorbers with different performance characteristics. Eighth, one embodiment of the present invention integrates the functions of an absorber and a heat exchanger in a single unit to take advantage of the temperature differential between the strong solution exiting the absorber and the weak solution entering the absorber.

These and other advantages will become apparent as this specification is read in conjunction with the accompanying drawings and appended claims.

BRIEF DESCRIPTION OF THE DRAWINGS

FIG. 5 is a longitudinal section of one embodiment of an absorber according to the present invention.

The drawings are not necessarily to scale and particular embodiments are sometimes illustrated by graphic symbols, diagrammatic representations, and fragmentary views. Details unnecessary for an understanding of the present invention may have been omitted. The invention is not limited to the particular embodiments illustrated herein.

In the Figures, the following reference characters are used:

10 absorption cooling system
12 absorber
14 heat exchanger
16 generator
18 condenser
20 evaporator
26 conduit: generator to condenser
30 conduit: condenser to evaporator
32 first expansion valve
34 second expansion valve
36 conduit: generator to heat exchanger
38 conduit: heat exchanger to absorber
40 conduit: evaporator to absorber
42 strong solution pump
43 conduit: absorber to strong solution pump
44 conduit: strong solution pump to heat exchanger
46 conduit: heat exchanger to generator
50 strong solution outlet
51 vapor inlet
52 solution distribution pan
53 coolant inlet
54 coolant outlet
55 weak solution inlet
56 outer housing
58 bottom plate assembly
60 top plate assembly
61 first helical coil rod
62 second helical coil rod (grooved)
63 third helical coil rod
64 fourth helical coil rod (grooved)
65 fifth helical coil rod
66 sixth helical coil rod (grooved)
67 bottom seal, first annular space
68 bottom seal, third annual space
69 bottom seal, fifth annular space
71 first cylinder wall
72 second cylinder wall
73 third cylinder wall
74 fourth cylinder wall
75 fifth cylinder wall
76 sixth cylinder wall
77 top seal, first annual space
78 top seal, third annular space
79 top seal, fifth annular space
82 weak solution pool
84 strong solution pool
92 distribution outlets
100 vertical axis
101 first annular space (coolant)
102 second annular space
103 third annular space (coolant)
104 fourth annular space
105 fifth annular space (coolant)
106 sixth annular space
110 ridges
112 grooves
150 absorption cooling system
152 first absorber (Absorber I)
154 second absorber (Absorber II)
156 first passage (solution)
158 second passage (vapor)
160 conduit: generator to Absorber II
162 expansion valve
164 strong solution pump
166 conduit: strong solution to Absorber II
168 first generator conduit: Absorber II to generator
170 second generator conduit: Absorber II to generator
200 multiple stage absorber
202 vertical axis
204 vapor inlet
205 lower distribution pan
206 coolant inlet
207 grooved helical coil rod
208 coolant outlet
209 helical passage for solution
210 square helical coil rod
211 lower strong solution outlet
212 helical passage for coolant
213 lower strong solution conduit
214 strong solution junction
215 upper strong solution conduit
216 first strong solution outlet
217 strong solution inlet
218 second strong solution outlet
220 weak solution inlet
222 upper distribution pan
224 grooved helical rod
226 helical passage
228 vapor passage

DETAILED DESCRIPTION OF THE INVENTION

Although the invention is described in connection with one or more preferred embodiments, the invention is not limited to those embodiments. The invention includes alternatives, modifications and equivalents that are included in the spirit and scope of the appended claims.

Figure 1:
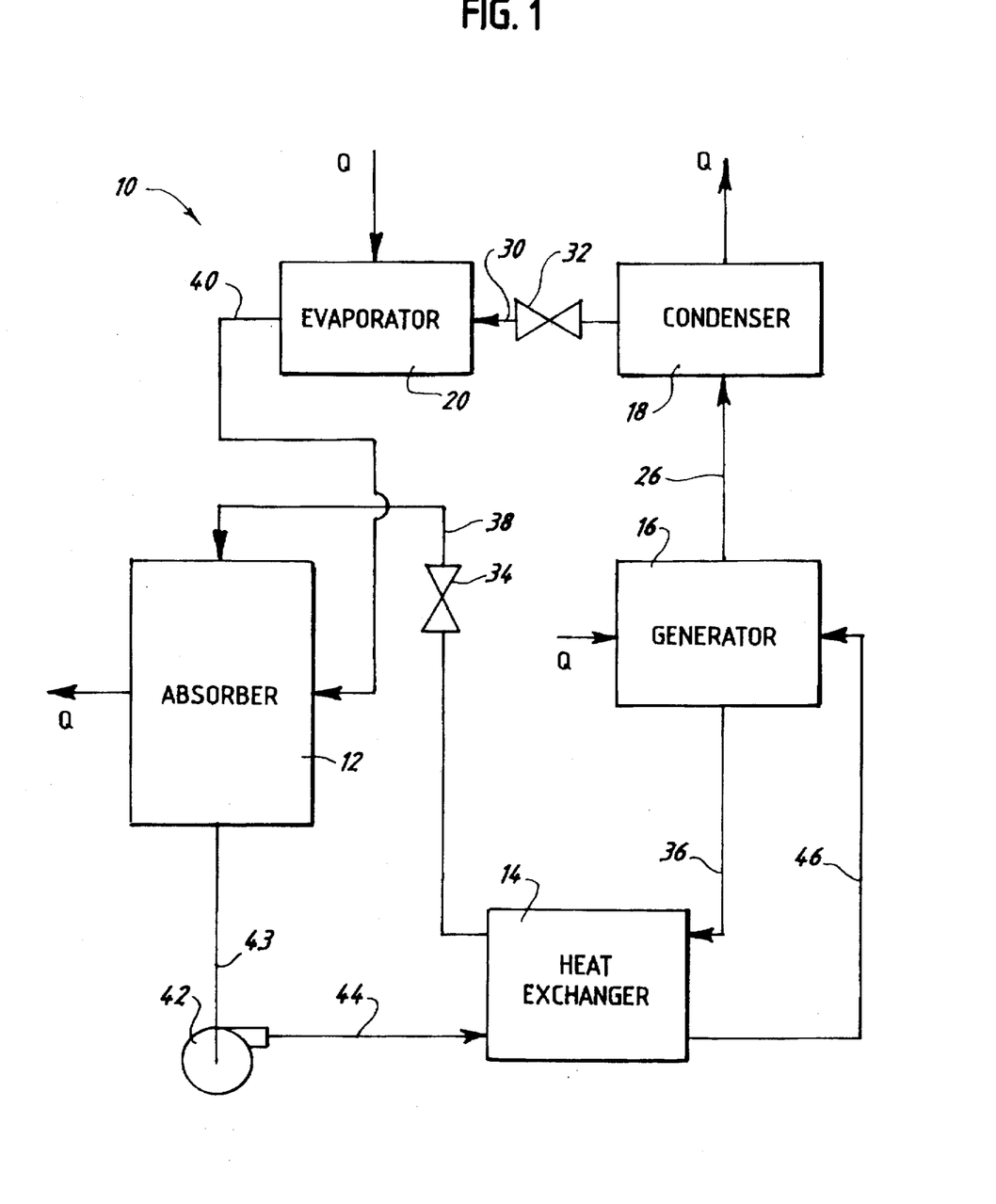
FIG. 1 is a schematic flow diagram of a typical absorption cooling system.

As seen in FIG. 1, one embodiment of the present invention operates in a typical absorption cooling system 10. The absorption cooling system 10 includes a generator 16, a condenser 18, an evaporator 20, an absorber 12, and heat exchanger 14.

When it enters the generator, the strong refrigerant solution generally has its maximum concentration of dissolved refrigerant vapor. The refrigerant solution is heated in the generator 16, as represented by the letter Q and the arrow indicating the direction of heat transfer. The heat distills the refrigerant from the solution to form a free refrigerant vapor and deplete the remaining liquid of refrigerant. The remaining liquid is now a "weak solution". The refrigerant vapor leaves the generator via the conduit 26 and flows to a condenser 18.

In the condenser 18, the refrigerant vapor is maintained under pressure and allowed to cool. As a result, the refrigerant vapor condenses to become a liquid. The heat of condensation Q is removed to a heat sink, which can be anything capable of absorbing heat.

The liquid refrigerant then flows to the evaporator 20 via the conduit 30. As the liquid refrigerant flows to the evaporator 20, the first expansion valve 32 relieves the pressure on the refrigerant. The refrigerant evaporates in the evaporator 20, absorbing heat Q into the system from a heat load to produce the cooling effect of the present system.

After the generator 16 drives the refrigerant from the strong solution, the weak solution remains. The weak solution is hot, having been heated to evaporate and separate the refrigerant vapor. The weak solution flows to the heat exchanger 14 via a conduit 36. In the heat exchanger 14, the weak solution transfers heat to the relatively cool, strong solution flowing to the generator 16.

The weak solution then flows to the absorber 12 via the conduit 38. A second expansion valve 34 regulates the pressure of the flow of the weak solution to the absorber 12. The refrigerant vapor also flows to the absorber from the evaporator 20 via the conduit 40. In the absorber, the refrigerant vapor is reabsorbed into the solution, becoming the strong solution.

After reabsorption, the resulting strong solution is pumped by the strong solution pump 42 to the heat exchanger 14 via the conduits 43 and 44. As previously described, the strong solution flows in heat exchange with the hotter, weak solution in the heat exchanger 14. The strong solution then flows back to the generator via the conduit 46. The process continuously repeats as long as the system is in operation.

The absorption process generates heat that must be removed to facilitate reabsorption of the refrigerant into the solution in the absorber 12. To transfer this heat, a heat transfer fluid, such as a liquid coolant, is circulated through the absorber 12. In the absorber 12, the liquid coolant draws heat from the solution. After circulating through the absorber, the liquid coolant exits the absorber and is either disposed or recycled through the system after cooling.

Figure 2:
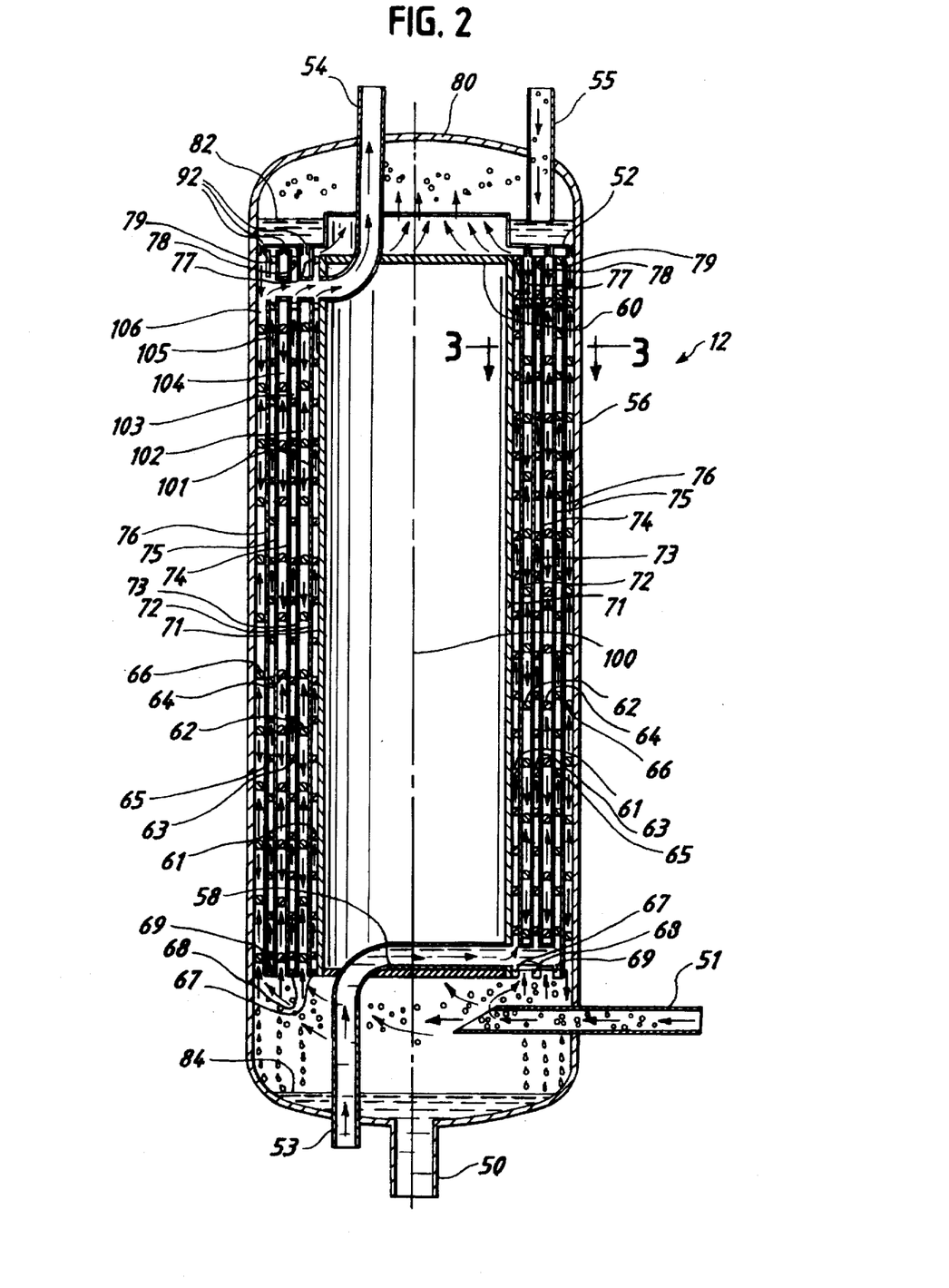
FIG. 2 is a longitudinal section of one embodiment of an absorber according to the present invention.
Figure 3:
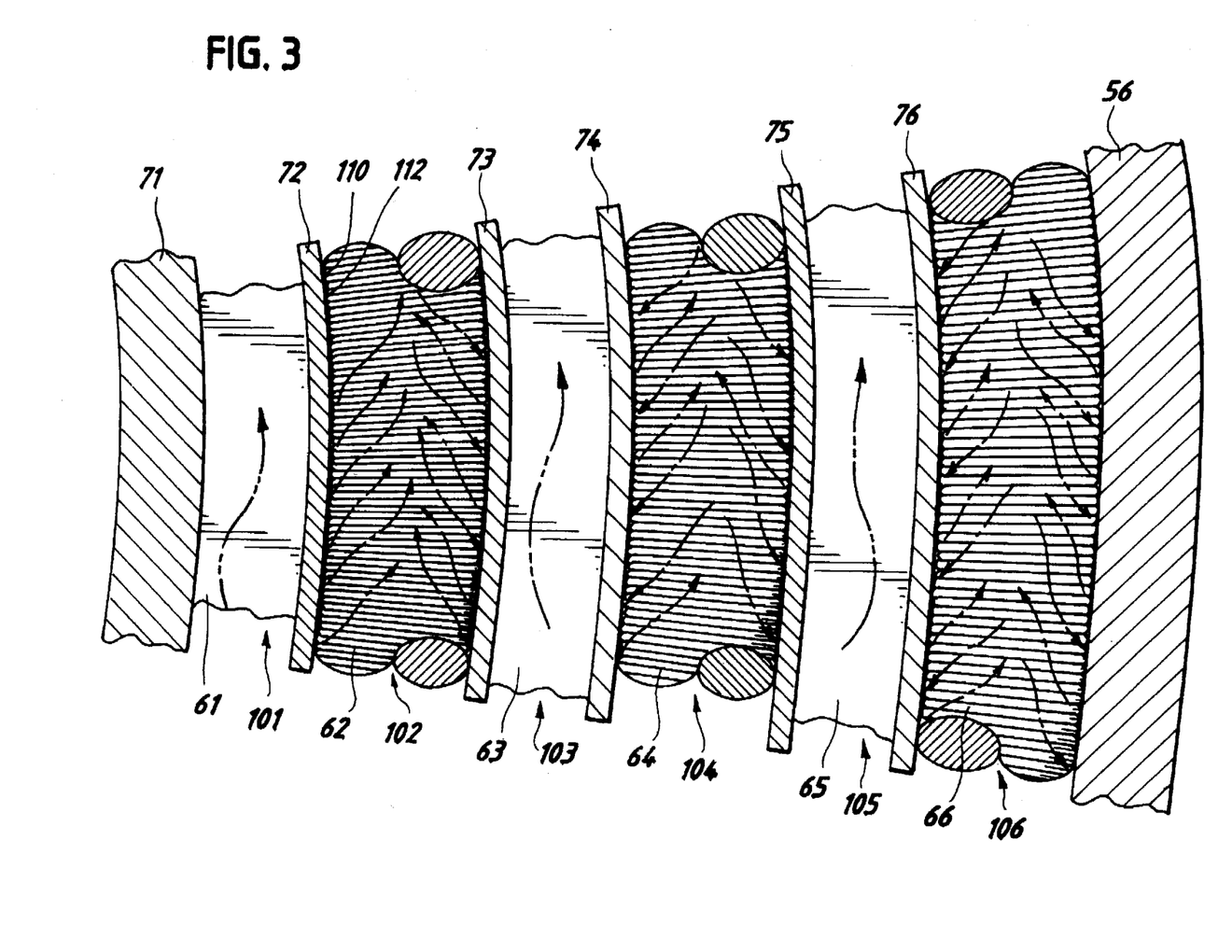
FIG. 3 is a fragmentary section taken along line 3—3 of FIG. 2.
Figure 4:
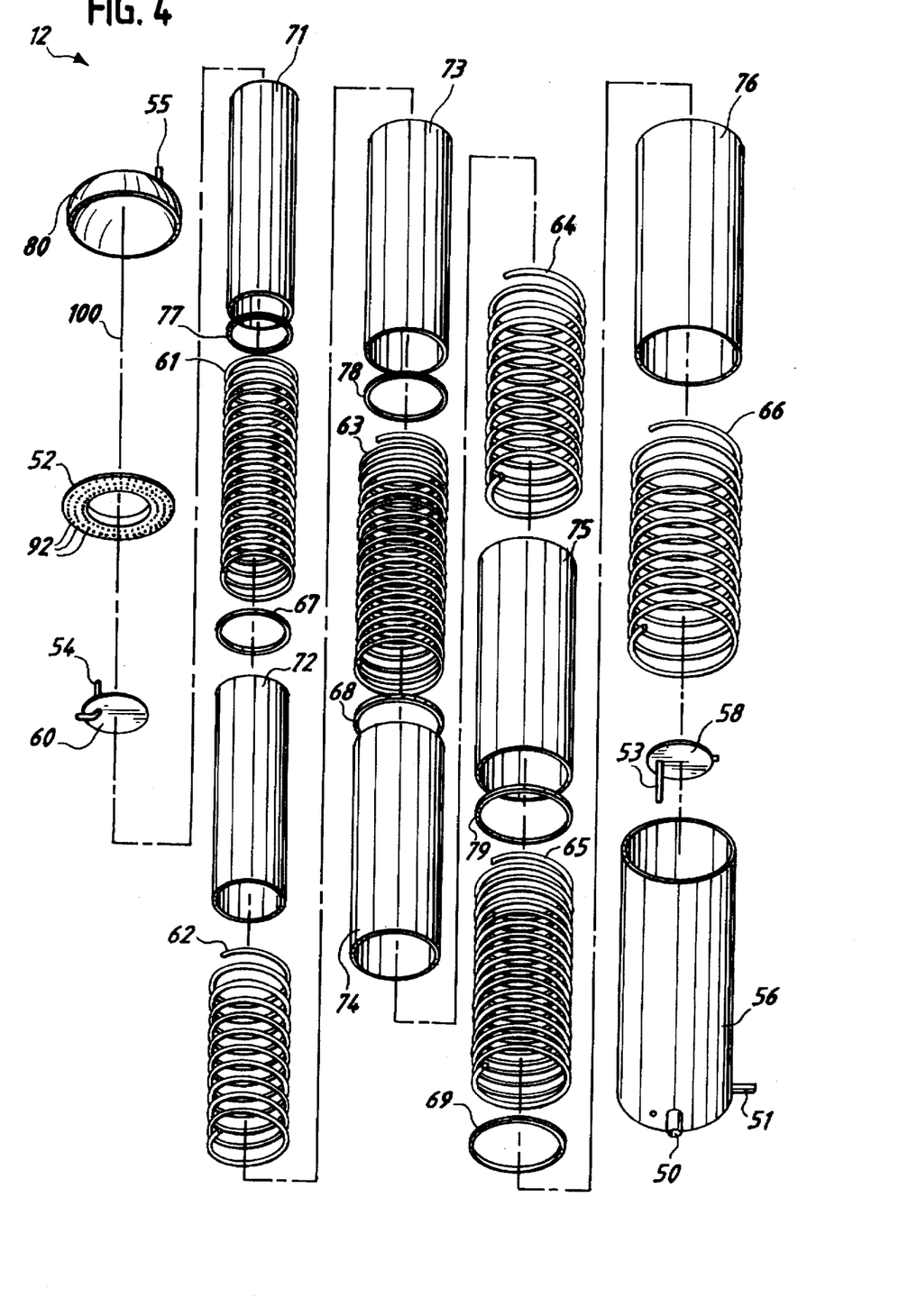
FIG. 4 is an exploded perspective view of the absorber of FIG. 2, showing details of its construction.

FIGS. 2–4 show one embodiment of an absorber 12 according to the present invention. FIG. 4 illustrates the components of this embodiment in greater detail. The absorber 12 is oriented about a normally substantially vertical axis 100. The absorber includes an outer housing 56, a bottom plate assembly 58, six concentric cylinder walls 71–76, six generally helical coil rods 61–66 located between the walls, top seals 77–79, bottom seals 67–69, a top plate assembly 60, a solution distribution pan 52, and an outer housing cover 80. More or less than six coil rods 61–66, and a corresponding greater or smaller number of walls 71–76 and other multiple elements, may be provided without departing from the scope of the invention.

The outer housing includes a strong solution outlet 50 and a vapor inlet 51. The bottom plate assembly includes a coolant inlet 53 that extends through the outer housing 56. The top plate assembly includes a coolant outlet 54 that extends through the outer housing cover 80. The outer housing cover 80 includes a weak solution inlet 55. The solution distribution pan 52 includes multiple distribution outlets 92.

On the absorber 12, the strong solution outlet 50 is connected to the conduit 43 that transfers strong solution from the absorber 12 to the strong solution pump 42. The vapor inlet 51 is connected to the conduit 40 that transfers vapor from the evaporator 20 to the absorber 12. The weak solution inlet 55 is connected to the conduit 38 that transfers weak solution from the heat exchanger 14 to the absorber 12. The coolant inlet 53 and coolant outlet 54 circulate liquid coolant and carry heat Q from the absorber.

As shown in FIGS. 2 and 3, the six cylinder walls 71–76 and the cylindrical outer housing 56 are substantially concentric about the substantially vertical axis 100. The seven cylinders thus have substantially parallel, substantially vertical walls that define six adjacent annular spaces 101–106 between the cylinders. The first annular space 101, for example, is bounded by the first cylinder wall 71 and the second cylinder wall 72. The second annular space 102 is bounded by the second cylinder wall 72 and the third cylinder wall 73, etc.

The generally helical coil rods 61–66 are located in the six annular spaces 101–106. The first generally helical coil rod 61, for example, is located in the first annular space 101. Similarly, the second through the sixth generally helical coil rods 62–66 are located, respectively, in the second through the sixth annular spaces 102–106.

The first annular space 101, third annular space 103, and fifth annular space 105 are sealed at the top and bottom. More specifically, the first annular space 101 is sealed at the top by the top seal 77 and at the bottom by the bottom seal 67. Similarly, the third annular space 103 is sealed by the top seal 78 and the bottom seal 68. Finally, the fifth annular space 105 is sealed by the top seal 79 and the bottom seal 69.

In this embodiment, the coolant enters via the coolant inlet 53, and is distributed to the first annular space 101, third annular space 103, and the fifth annular space 105 (the three liquid coolant passages) under pressure. The first annular space 101, the third annular space 103, and the fifth annular space 105 carry the liquid coolant from the coolant inlet 53 to the coolant outlet 54. The flow of the liquid coolant in the liquid coolant passages is represented in FIG. 2 by the upward pointing solid-headed arrows.

The second annular space 102, the fourth annular space 104, and the sixth annular space 106 carry the solution downward, as represented in FIG. 2 by the downward pointing solid-headed arrows, and the refrigerant vapor upward, as represented by the upward pointing outline-headed arrows. The weak solution enters the absorber 12 at the weak solution inlet 55. The weak solution collects as a pool 82 in the solution distribution pan 52. The weak solution drips through distribution outlets 92 into the second annular space 102, fourth annular space 104, and the sixth annular space 106 (the three solution passages). The solution flows downward under the force of gravity through the three solution spaces.

The refrigerant vapor enters the absorber 12 at the vapor inlet 51. The refrigerant vapor flows upward into the three solution spaces 102, 104, and 106. Within the spaces, the refrigerant vapor flows upward in counter-flow with the downward flowing solution. The counter-flow enables the solution to become fully saturated with refrigerant.

The now strong solution flows downward out of the three solution spaces 102, 104, and 106 and collects in a pool 84 at the bottom of the absorber 12. The strong solution exits the absorber at the strong solution outlet 50 and flows to the heat exchanger 14 and then the generator 16.

The cylinder walls 71–76 are thermally conductive and allow heat transfer to the liquid coolant from the solution and the refrigerant vapor. The solution and refrigerant vapor in the second annular space 102, for example, transfer heat through the second cylinder wall 72 and the third cylinder wall 73 to the liquid coolant circulating in the first annular space 101 and the third annular space 103, respectively. The liquid coolant facilitates the reabsorption of the refrigerant vapor into the solution by cooling the solution and refrigerant vapor as heat is generated in the course of absorption.

In this embodiment, the solution and the liquid coolant flow in alternating and adjacent annular spaces to provide a large heat transfer area for the liquid coolant to cools the solution. However, additional features can be provided to further enhance heat exchange.

As described above, the six annular spaces 101–106 respectively contain the generally helical coil rods 61–66. Each generally helical coil rod such as 61 breaks one of the annular spaces such as 101 into a generally helical path defined by the space between the runs of the coil rod 61. Thus, a generally helical coil rod creates a tortuous path within each annular space.

In the three liquid coolant spaces 103, and 105 the helical coil rods 61, 63, and 65 can be square-section rods, although rods having round or other cross-sections may be used. As shown in FIG. 3, the square rods 61, 63, and 65 substantially continuously abut the adjacent cylinder walls. In the first annular space 101, for example, the square rod 61 abuts the first cylinder wall 71 and the second cylinder wall 72. The rods and walls can fit tightly, or additional sealing material or welds can be provided to secure the rods to the walls. Any expedient can be used that will prevent or limit the substantially vertical flow of fluid between the runs of the square rod such as 61 and the cylinder walls such as 71 and 72. Similarly, in the third annular space 103 and the fifth annular space 105, the square rods 63 and 65 each abut the thermally conductive cylinder walls that embrace them.

In the three liquid coolant spaces 101, 103, and 105, the square rods 61, 63, and 65 extend in an open-wound helix (meaning that the rods are wound so each run is axially separated from the preceding and following runs) extending from the bottom of the liquid coolant passages to the top of the passages. Because the square rods continuously abut adjacent cylinder walls, an enclosed or substantially enclosed generally helical passage is formed from the bottom to the top of each liquid coolant space. The enclosed generally helical passage allows liquid coolant to be pumped in a generally helical path through each liquid coolant space.

The long, generally helical path followed by the liquid coolant increases the time the liquid coolant spends in the absorber 12. The liquid coolant reaches or comes closer to the temperature of the solution when it resides longer in the absorber. Accordingly, substantially the full cooling potential of the liquid coolant may be realized.

Also, the generally helical path is created inexpensively, using a relatively inexpensive assembly of thermally conductive cylinders and generally helical coil rods. Further, provided the generally helical path is filled or substantially filled with the coolant, the generally helical path of the liquid coolant cools substantially the entire cylinder on each side of the liquid coolant passage. The thermally conductive cylinder walls have large surface areas and substantially the entire surface area may be used to transmit heat from the solution to the liquid coolant.

In the three solution spaces 102, 104, and 106, the generally helical coil rods 62, 64, and 66 are round, circumferentially grooved or generally helically threaded rods. Rods having other cross-sections can also be used. As shown in FIG. 3, the grooved rods such as 62 have substantially vertical ridges such as 110 and grooves such as 112 along their lengths defining a grooved surface. In the second annular space 102, the ridges of the grooved rod 62 abut the second cylinder wall 72 and the third cylinder wall 73. In the fourth annular space 104, the ridges of the grooved rod 64 abut the fourth cylinder wall 74 and the fifth cylinder wall 75. In the sixth annular space 106, the ridges of the grooved rod 66 abut the sixth cylinder wall 76 and the cylindrical outer housing 56.

In the three solution spaces 102, 104, and 106, the grooved rods 62, 64, and 66 each extend in a helix from the top of the corresponding solution space to the bottom of the space and break the solution space into a generally helical tortuous path.

The weak solution drips from the solution distribution pan 52 through the distribution outlets 92 into the tops of the three solution spaces. In each solution space such as 102, the weak solution drips onto the grooved rod 62 and flows circumferentially about the rod 62 through the grooves 112. The weak solution forms a falling film along the cylinder walls on either side of each grooved rod. The grooved rod meters the flow of the solution and controls the thickness of the falling film below it. At the next level, the solution again meets a grooved rod and the process repeats. Thus, a substantially vertically falling film is formed on substantially the entire surface of the opposed cylinder walls.

Meanwhile, in the same solution passages, refrigerant vapor circulates upward at least predominantly along the generally helical path. Thus, refrigerant vapor fills the generally helical path and is absorbed by the solution flowing down the cylinder walls. As the solution falls along the cylinder walls, the solution is simultaneously in intimate contact with the cooled cylinder walls and with the refrigerant vapor in the generally helical path. Accordingly, the solution dissipates heat through the cylinder to the coolant and simultaneously absorbs refrigerant vapor.

Alternatively, the ridges 110 and the valleys 112 of the grooved rods may be small enough that the solution both flows down the generally helical path and drips between the grooved rod and the cylinder walls. Under this alternative, the solution and the refrigerant vapor are in parallel counterflow in the generally helical path, as well as counterflowing in the manner previously described. In this embodiment, the ridges of the grooved rod create turbulence in the flow of the solution. This turbulence causes refrigerant-rich solution at the top of the flow to blend locally with refrigerant-poor solution at the bottom of the flow. The ridges thereby further promote the solution becoming fully saturated with refrigerant. As a further alternative, a rod essentially stopping vertical flow between itself and the cylinder wall may replace the grooved rod in the solution passages so that the solution and refrigerant vapor are in simple counterflow in the generally helical path.

Several alternative embodiments are also within the scope of the present invention. For example, the tortuous fluid path of the present invention need not be formed by a rod placed between two walls. The same tortuous path may be formed by integrating the rod and one of the parallel walls.

In addition, the walls of the present invention need not be circular cylinders. By definition, a cylinder is any surface or solid bounded by two parallel planes and generated by a line tracing a closed curve perpendicular to the given planes. Accordingly, the cross-section of the cylinder walls of the present invention may be any closed curve including a rectangle, square, triangle, oval, etc.

Moreover, the walls need not be cylinders but may be flat, parallel, planar surfaces. A rod or a series of staggered, generally horizontally disposed rods may be placed between two flat walls and thereby create a tortuous fluid path between the walls. This embodiment is within the teachings of the present invention. The rod need not be a generally helical coil to realize some of the advantages of the present invention.

Also, the rod may take the form of one or more hoops, or may be broken into multiple rods between parallel walls. In addition, the grooves on the rod may be transferred from the rod to the surface of the wall. A non-grooved rod placed against a substantially vertically grooved or corrugated wall would realize at least some of the advantages of the present invention.

The concentric cylinders of the illustrated embodiment facilitate a compact design that is relatively inexpensive to manufacture. The generally helical coils maximize the distance of fluid flow in a cylindrical space. Also, the generally helical coils are readily available and easily manufactured using modern spring-making technology. Further, the generally helical coils allow a manufacturer to modify the performance characteristics of the absorber.

An absorber performs optimally when the solution becomes fully saturated with refrigerant, all vapor entering the absorber is absorbed, and the absorber wastes no potential cooling in the liquid coolant. The generally helical coils illustrated in the present Figures allow a user to modify the performance characteristics of the absorber. By using longer, tighter coils in the liquid coolant passages a manufacturer may increase the distance traveled by the liquid coolant and, correspondingly, increase the heat transfer to the liquid coolant. Alternatively, a manufacturer may use longer, tighter coils in the solution passages and increase the time the solution spends in contact with refrigerant vapor.

A manufacturer may use a common housing and identical cylinders to manufacture absorbers with different performance characteristics. The absorbers are distinguished by the tightness of the generally helical coils placed in the absorber. Thus, a manufacturer may offer a standardized absorber size that meets varying performance needs. Also, the dissimilar absorbers may be manufactured on a common assembly line with common parts, significantly reducing the costs of assembly and parts.

Interchangeable generally helical coils are therefore an advantage of the present invention. However, non-removable coils are within the scope of the invention. This and other modifications to the present invention would be obvious to one skilled in the art who is familiar with the present disclosure.

Further, the present invention is not limited to the precise form of apparatus disclosed. One skilled in the art may easily and readily adapt the teachings of the present invention to any device with two fluids in heat exchange. In particular, one skilled in the art may readily apply the spiral design and its accompanying benefits to the known art of heat exchangers. In a heat exchanger, a hot fluid flows in heat exchange with a colder fluid. Using the teachings of the present invention, one skilled in the art could easily develop a heat exchanger that circulates one fluid in a generally helical path in heat exchange with the other fluid.

Also, one skilled in the art could apply the teachings of the present invention to an absorption cooling system generator design. A generator is merely an absorber operating in reverse. Heat is supplied to a generator to drive vapor from a solution. Heat is withdrawn from an absorber to dissolve vapor in a solution. Accordingly, by merely inverting the present invention and supplying a hot fluid in place of the coolant, it may be operated as a generator. Rather than dissolving refrigerant vapor in an initially weak solution, the device would then drive refrigerant vapor from an initially strong solution.

In fact, the present invention may be used to combine the functions of a generator, an absorber, and a heat exchanger. In one embodiment, an absorption cooling system includes a first absorber that operates as a traditional absorber as described in detail above and a second absorber that operates as a generator, an absorber, and a heat exchanger.

A device that operates as a generator to drive vapor from solution, an absorber to absorb vapor into solution, and a heat exchanger to exchange heat between fluids is sometimes referred to as a "GAX" device (generator-absorber-heat exchanger).

Figure 5:
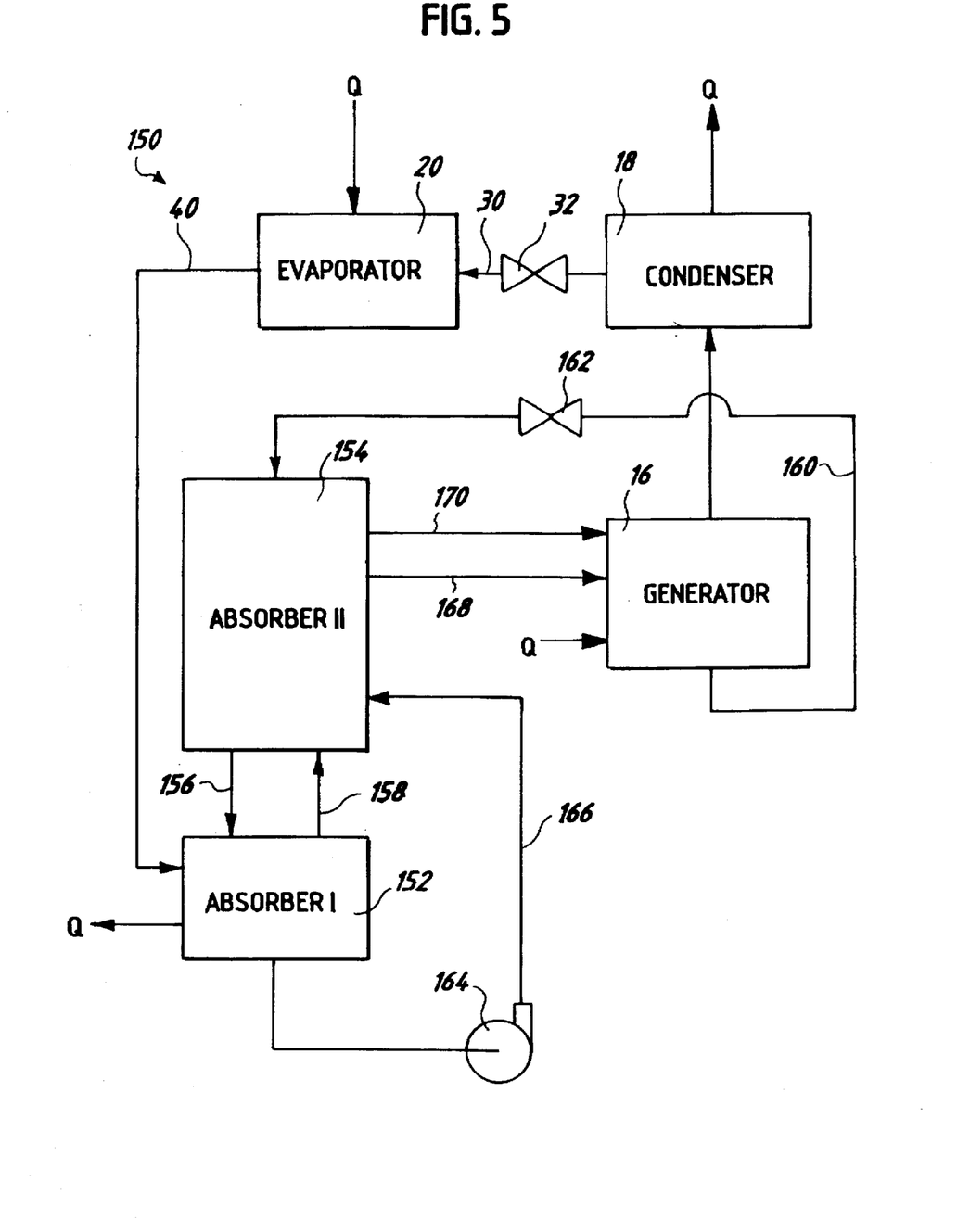
FIG. 5 is a schematic flow diagram of an absorption cooling system utilizing the absorbers of the present invention.

FIG. 5 illustrates a second absorption cooling system 150 featuring one embodiment of the present invention. The absorption cooling system includes a generator 16, a condenser 18, an evaporator 20, a first absorber 152 (Absorber I) and a second absorber 154 (Absorber II). For the purpose of describing the operation of the absorbers, the condenser 18 and evaporator 20 operate as described above.

Absorber I operates similar to the absorber 12 described above. Absorber I receives vapor from the evaporator 20 via the conduit 40. Absorber I receives solution via a first passage 156. Like the absorber 12 described above, Absorber I circulates the solution downward and the vapor upward in helical passages to partially absorb the vapor in the solution. Also, Absorber I circulates a coolant upward in helical passages in heat exchange relationship with the solution and the vapor (removing heat Q from the absorber) to facilitate absorption of the vapor into the solution. However, unlike the absorber 12 described above, Absorber I releases excess vapor to Absorber II via a second passage 158. Alternatively, the first passage 156 and the second passage 158 may be the same passage.

Absorber II operates as a second absorber. As shown in FIG. 5, the hot, weak solution flows from the generator 16 via the conduit 160 through the expansion valve 160 to Absorber II. Absorber II circulates the hot, weak solution downward and the vapor received from Absorber I upward to absorb the vapor in the solution.

In addition, Absorber II operates as a heat exchanger. The strong solution from Absorber I is pumped by the strong solution pump 164 via the conduit 166 to Absorber II. Much like the heat exchanger 14 described above, Absorber II circulates the cooler, strong solution in heat exchange relationship with the hotter, weak solution from the generator 16. The weak solution transfers heat to the strong solution to preheat the strong solution before it reaches the generator 16. However, unlike the heat exchanger 14 described above, the strong solution facilitates absorption of vapor into the weak solution by absorbing the heat of absorption in Absorber II. Some of the strong solution then flows to the generator 16 via the first generator conduit 168.

Finally, Absorber II operates as a generator. The strong solution remaining in Absorber II continues to circulate in heat exchange relationship with the hot, weak solution, causing the strong solution to become superheated. As it becomes superheated, the strong solution releases at least some vapor. The strong solution and vapor mixture then flows to the generator 16 via the second generator conduit 170. Because the strong solution has already been superheated to release at least some vapor, the load on the generator 16 is lightened and the temperature differential between the weak and strong solution may be utilized.

Figure 6:
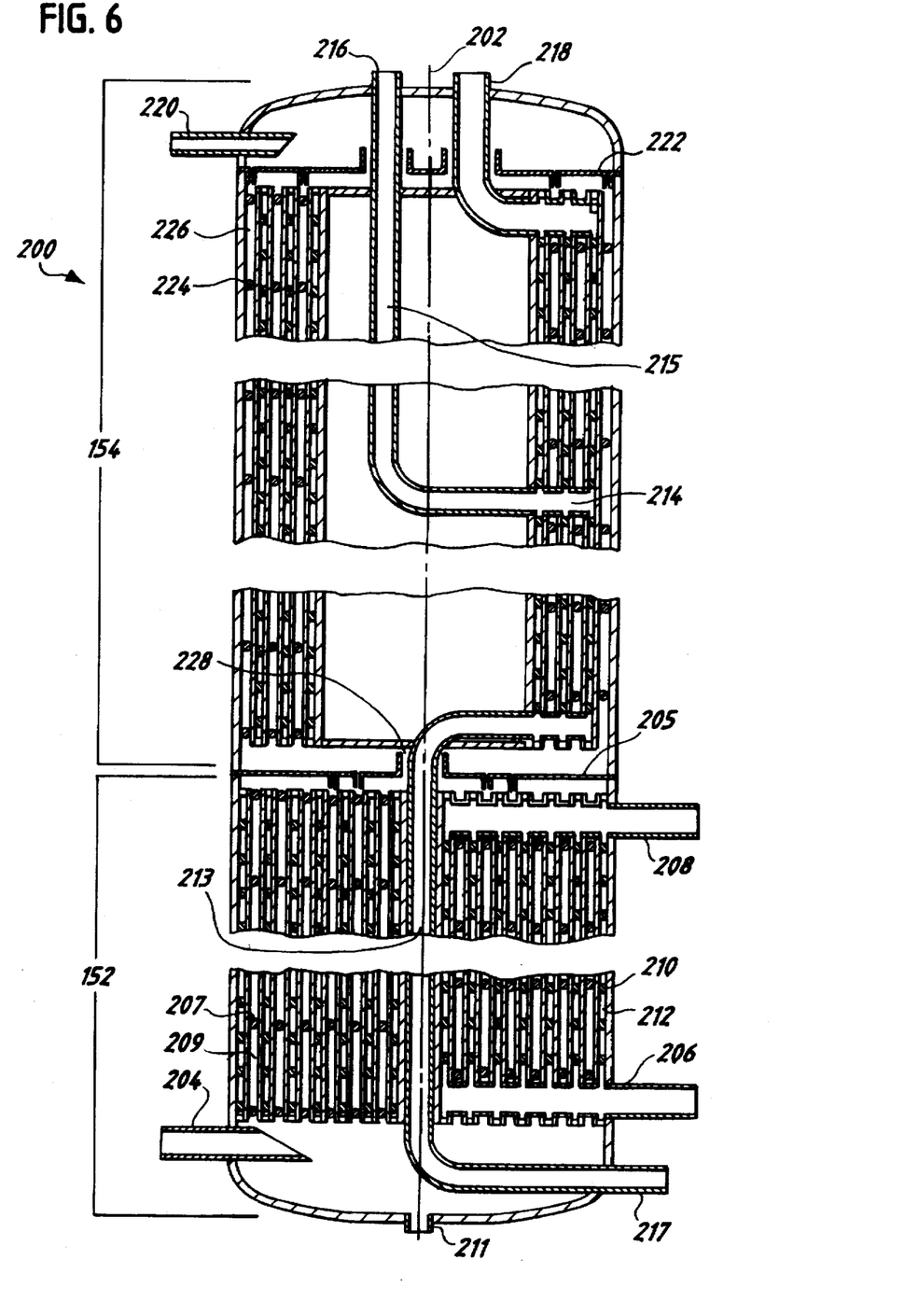

FIG. 6 illustrates one embodiment of Absorber I and Absorber II. FIG. 6 has been partially cut away to better illustrate the features of the present invention. In FIG. 6, Absorber I and Absorber II have been combined in a single unit, the multiple stage absorber 200. Absorber I and Absorber II may also be operated as separate and distinct apparatus. However, by combining Absorber I and Absorber II in a single unit, space may be conserved and effective vapor and solution flow encouraged. Absorber I 152 is the lower section of the absorber 200 and Absorber II 154 is the upper section. As is shown in FIG. 6, both sections employ the technology described above. Both absorbers have concentric, thermally conductive cylinders that define adjacent annular spaces. Also, both sections employ helical coil rods to create a helical passage for fluid flow. Accordingly, because these features of the present invention have been described in detail in reference to FIGS. 2-4, they will not be discussed extensively in reference to the multiple stage absorber As shown in FIG. 6, the multiple stage absorber 200 is oriented about a vertical axis 202. Vapor from the evaporator 20 enters Absorber I at vapor inlet 204 via the conduit 40. Intermediate solution enters Absorber I through the lower distribution pan 205. The intermediate solution drips into the tops of the solution spaces and flows downward. As previously described, the solution spaces contain grooved helical coil rods that create helical passages in the solution spaces. For example, the grooved helical coil rod 207 creates the helical passage 209.

The vapor enters the bottom of the solution spaces and flows upward in the helical passages in counterflow with the intermediate solution. Coolant enters the first absorber section 152 at the coolant inlet 206 and flows upward in the helical passages created by the square helical coil rods in the coolant spaces. For example, the square helical coil rod 210 creates the helical passage 212. The coolant is in heat exchange relationship with the intermediate solution and the vapor, facilitating absorption of the vapor into the solution. After absorbing heat Q, the coolant exits the first absorber section 152 at the coolant outlet However, all vapor is not absorbed in Absorber I. The excess vapor flows upward out of the solution spaces, through the vapor passage 228, and into Absorber II.

After absorbing at least some of the vapor, the intermediate solution becomes a strong solution and drips from the solution spaces to the bottom of Absorber I. The strong solution exits Absorber I at the lower strong solution outlet 211 and flows via the conduit 166 to the strong solution inlet 217. The strong solution flows up through the lower strong solution conduit 213 to Absorber II. The strong solution circulates upward in helical passages (created by square helical coil rods) within Absorber II.

The hot, weak solution flows from the generator 16 via conduit 160 and enters Absorber II through weak solution inlet 220. The weak solution collects in the upper distribution pan 222, drips into the tops of the weak solution spaces, and flows downward. Like the solution spaces in Absorber I, the weak solution spaces contain grooved helical coil rods that create helical passages in the weak solution spaces. For example, the grooved helical coil rod 224 creates the helical passage 226.

Vapor enters Absorber II through the vapor passage 228 and flows upward in the helical passages in counterflow with the intermediate solution. The strong solution, flowing upward in the helical strong solution passages, acts as a coolant for the hotter weak solution. Thus, the cooler strong solution facilitates absorption of the remaining vapor in the weak solution.

Some of the strong solution is diverted from second absorber section 154 at the strong solution junction 214. A portion of the strong solution flows through the upper strong solution conduit 215 and exits Absorber II at the first strong solution outlet 216. The diverted strong solution then flows to the generator 16 via the first generator conduit 168. A portion of the strong solution is diverted so that, as described above, the remaining strong solution may be superheated by the weak solution. The superheated strong solution exits Absorber II at the second strong solution outlet 218 and flows to the generator 16 via the second generator conduit 170.

To facilitate fluid flow in the absorbers of the present invention, the pitch of the helical coil rods may be varied. (As used here, pitch is the angle from horizontal of the helical coil rod at a given length of the rod. Pitch also translates into the distance between successive runs of the helical coil. An increase in pitch increases the distance between successive runs of the coil.) Ideally, the velocity of the vapor flow remains constant as the vapor flows upward through an absorber. However, as the vapor is absorbed in a downward flowing solution, the decrease in vapor volume causes the vapor velocity to decrease within the helical passage. Fluctuations in vapor velocity result in inconsistent absorption characteristics within the absorber. Accordingly, it is desirable to maintain a constant vapor velocity.

The vapor velocity may be maintained by decreasing the pitch of the grooved helical coil rod as the vapor moves upward. If the pitch is decreased as the vapor moves upward, the cross-sectional profile of the helical passage decreases. Accordingly, despite the decrease in volume of vapor as it is absorbed in solution, the vapor maintains a constant velocity. Conversely, in the strong solution passage, the pitch of the square helical rod may be increased as the strong solution moves upward to provide additional space for the vapor that is boiled out of the strong solution.

As previously mentioned, Absorbers I and II may operate as separate units or as a single unit. Preferably, the absorbers operate as a single unit with Absorber II atop Absorber I as shown in FIG. 6. This embodiment offers many advantages. First, this embodiment easily accommodates the flow of solution from Absorber II and vapor from Absorber I. Second, the multiple stage absorber 200 replaces both a traditional absorber and a traditional heat exchanger with a single component. The single component is more easily manufactured, shipped, set up, and operated. Finally, the multiple stage absorber 200 is very compact in design. Because of the helical coil technology, the overall volume of the multiple stage absorber is much less than similarly performing absorbers. The helical coil technology obviates the need for a large vapor space in the absorber.

In addition, the multiple stage absorber 200 is vertically oriented with a relatively small horizontal cross-section or "footprint". This offers a simple but very practical advantage. The unit requires very little floor or ground space. Most heating and cooling units operate in small closets or on small slabs of concrete in an outdoor setting. Thus, in the typical operational setting for the present invention, vertical space is readily available but floor space is scarce. Therefore, a small footprint is critical.

Many alterations, variations, and combinations are possible that fall within the scope of the present invention. Although the preferred embodiments of the present invention have been described, those skilled in the art will recognize other modifications that may be made that would nonetheless fall within the scope of the present invention. Therefore, the present invention should not be limited to the apparatus and method described. Instead, the scope of the present invention should be consistent with the invention claimed below.

What is claimed is:

1. An absorber for use in an absorption cooling system comprising:
    a plurality of substantially concentric cylinders defining a plurality of annular spaces between the cylinders;
    the annular spaces including a solution space for carrying a solution and an adjacent heat transfer fluid space for carrying a heat transfer fluid, the cylinder between the solution space and heat transfer fluid space being thermally conductive to allow heat transfer between the solution and the heat transfer fluid;
    a first generally helical coil rod located in the solution space and defining a first generally helical passage within the solution space; and
    a second generally helical coil rod located in the heat transfer fluid space and defining a second generally helical passage within the heat transfer fluid space.

2. The absorber of claim 1, further comprising:
    the concentric cylinders having a substantially vertical axis;
    the first generally helical passage carrying a solution downward and a vapor upward in the solution space to at least partially absorb the vapor in the solution; and
    the second generally helical passage carrying a heat transfer fluid upward in the heat transfer fluid space in heat exchange relationship with the solution and the vapor to facilitate absorption of the vapor into the solution.

3. The absorber of claim 1, wherein the pitch of the first generally helical coil rod varies along the rod.

4. The absorber of claim 3, wherein the pitch of the first generally helical coil rod decreases upwardly, thereby decreasing the cross-sectional profile of the generally helical passage as the vapor moves upward.

5. The absorber of claim 2, wherein the pitch of the first generally helical coil rod varies along the rod.

6. The absorber of claim 5, wherein the pitch of the second generally helical coil rod increases upwardly, thereby increasing the cross-sectional profile of the generally helical passage as the heat transfer fluid moves upward.

7. An absorption cooling system comprising:
    a generator;
    a condenser;
    an evaporator;
    a first absorber having a plurality of substantially concentric cylinders defining a plurality of first absorber annular spaces between the cylinders;
    the first absorber annular spaces including a solution space for carrying a solution and an adjacent heat transfer fluid space for carrying a heat transfer fluid, the cylinder between the solution space and the heat transfer fluid space being thermally conductive to allow heat transfer between the solution and the heat transfer fluid;
    a first generally helical coil rod located in the solution space and defining a first generally helical passage within the solution space;
    a second generally helical coil rod located in the heat transfer fluid space and defining a second generally helical passage within the heat transfer fluid space; and
    a second absorber having a weak solution space and a strong solution space in heat exchange relationship.

8. The absorber of claim 7, further comprising:
    the second absorber having a plurality of substantially concentric cylinders defining a plurality of second absorber annular spaces between the cylinders;
    the second absorber annular spaces including the weak solution space and the strong solution space; the weak solution space and the strong solution space being adjacent and separated by a thermally conductive cylinder;
    a third generally helical coil rod located in the weak solution space and defining a third generally helical passage within the weak solution space; and
    a fourth generally helical coil rod located in the strong solution space and defining a fourth generally helical passage within the strong solution space.

9. The absorber of claim 8, further comprising:
    the concentric cylinders in the first and second absorber having substantially vertical axes;
    the solution in the first absorber is an intermediate solution;
    the first generally helical passage carrying the intermediate solution downward and a vapor upward in the solution space to at least partially absorb the vapor in the intermediate solution to create a strong solution;
    the second generally helical passage carrying a heat transfer fluid upward in the heat transfer fluid space in heat exchange relationship with the intermediate solution and the vapor to facilitate absorption of the vapor into the intermediate solution;
    a first passage connecting the solution space of the first absorber and the weak solution space of the second absorber and allowing vapor from the first absorber not absorbed in the intermediate solution to flow to the weak solution space of the second absorber;
    a second passage connecting the solution space of the first absorber and the weak solution space of the second absorber and allowing intermediate solution from the second absorber to flow to the solution space of the first absorber;
    a conduit connecting the solution space of the first absorber and the strong solution space of the second absorber and allowing strong solution from the first absorber to flow to the strong solution space of the second absorber;
    the third generally helical passage carrying the weak solution downward and the vapor from the first absorber upward in the weak solution space to at least partially absorb the vapor in the weak solution to create the intermediate solution;
    the fourth generally helical passage carrying the strong solution in the strong solution space in heat exchange relationship with the weak solution and the vapor to facilitate absorption of the vapor into the weak solution.

10. The absorber of claim 8, further comprising:

the concentric cylinders in the first and second absorber having substantially vertical axes;

the solution in the first absorber is an intermediate solution;

the first generally helical passage carrying the intermediate solution downward and a vapor upward in the solution space to at least partially absorb the vapor in the intermediate solution to create a strong solution;

the second generally helical passage carrying a heat transfer fluid upward in the heat transfer fluid space in heat exchange relationship with the intermediate solution and the vapor to facilitate absorption of the vapor into the intermediate solution;

a passage connecting the solution space of the first absorber and the weak solution space of the second absorber and allowing vapor from the first absorber not absorbed in the intermediate solution to flow to the weak solution space of the second absorber and intermediate solution from the second absorber to flow to the solution space of the first absorber;

a conduit connecting the solution space of the first absorber and the strong solution space of the second absorber and allowing strong solution from the first absorber to flow to the strong solution space of the second absorber;

the third generally helical passage carrying the weak solution downward and the vapor from the first absorber upward in the weak solution space to at least partially absorb the vapor in the weak solution to create the intermediate solution;

the fourth generally helical passage carrying the strong solution in the strong solution space in heat exchange relationship with the weak solution and the vapor to facilitate absorption of the vapor into the weak solution.

11. The absorber of claim 9 wherein the second absorber is located above the first absorber section so that vapor may flow upward and intermediate solution may flow downward between the first and second absorber.

12. The absorber of claim 9 wherein the first and second absorbers are a single unit.

13. A method of absorbing a vapor into a solution comprising the steps of:

providing a plurality of substantially concentric cylinders defining a plurality of annular spaces between the cylinders, the annular spaces including a solution space and an adjacent heat transfer fluid space, the cylinder between the solution space and the heat transfer fluid space being thermally conductive, providing a rod in the solution space to define a tortuous fluid path in the solution space, circulating a solution and a vapor in the tortuous fluid path in heat exchange relationship with a heat transfer fluid in the heat transfer fluid space.

14. The method of claim 13 wherein the rod is a generally helical rod that defines a generally helical passage for circulating the solution and the vapor in a helical path within the solution space.

15. A method of absorbing a vapor in solution comprising the steps of:

providing a first absorber having a plurality of substantially concentric cylinders defining a plurality of annular spaces between the cylinders, the concentric cylinders having a substantially vertical axis, the annular spaces including a solution space and an adjacent heat transfer fluid space, the cylinder between the solution space and the heat transfer fluid space being thermally conductive;

providing a first generally helical coil rod in the solution space to define a first generally helical passage within the solution space;

providing a second generally helical coil rod in the heat transfer fluid space to define a second generally helical passage within the heat transfer fluid space;

directing a solution downward in the first generally helical passage;

directing a vapor upward in the first generally helical passage to at least partially absorb the vapor in the solution to create a strong solution;

directing a heat transfer fluid upward in the second generally helical passage in heat exchange relationship with the solution and the vapor to facilitate absorption of the vapor into the solution.

16. The method of claim 15 further including the steps of:

providing a second absorber having a weak solution space and a strong solution space in heat exchange relationship;

directing the strong solution created in the first absorber to the second absorber;

circulating the strong solution in the strong solution space in heat exchange relationship with a weak solution in the weak solution space;

directing the weak solution to the first absorber.

17. The method of claim 16 wherein the second absorber has a plurality of substantially concentric cylinders defining a plurality of annular spaces between the cylinders, the concentric cylinders having a substantially vertical axis, the annular spaces including the weak solution space and the strong solution space; the weak solution space and the strong solution space being adjacent and separated by a thermally conductive cylinder; and further including the steps of:

providing a third generally helical coil rod in the weak solution space to define a third generally helical passage within the weak solution space;

providing a fourth generally helical coil rod in the strong solution space to define a fourth generally helical passage within the strong solution space;

directing the vapor from the first absorber not absorbed in the solution to the second absorber;

directing the weak solution downward in the third generally helical passage;

directing the vapor from the first absorber upward in the third generally helical passage to at least partially absorb the vapor in the weak solution to create an intermediate solution;

directing the strong solution upward in the fourth generally helical passage in heat exchange relationship with the weak solution and the vapor from the first absorber to facilitate absorption of the vapor into the weak solution;

directing the intermediate solution to the first absorber.

\* \* \* \* \*